United States Patent
Lee

(10) Patent No.: US 9,613,290 B2
(45) Date of Patent: *Apr. 4, 2017

(54) IMAGE COMPARISON USING COLOR HISTOGRAMS

(71) Applicant: The Nielsen Company (US), LLC, Schaumburg, IL (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/551,824

(22) Filed: Nov. 24, 2014

(65) Prior Publication Data
US 2015/0078658 A1    Mar. 19, 2015

Related U.S. Application Data

(63) Continuation of application No. 13/324,624, filed on Dec. 13, 2011, now Pat. No. 8,897,553.

(51) Int. Cl.
*G06K 9/00* (2006.01)
*G06K 9/46* (2006.01)
(Continued)

(52) U.S. Cl.
CPC ..... *G06K 9/4642* (2013.01); *G06F 17/30802* (2013.01); *G06K 9/00758* (2013.01); *G06K 9/3241* (2013.01); *G06K 9/4652* (2013.01)

(58) Field of Classification Search
CPC ... G06K 9/3241; G06K 9/4642; G06K 9/4652
(Continued)

(56) References Cited

U.S. PATENT DOCUMENTS 4,996,594 A   2/1991   Murayama
5,426,684 A   6/1995   Gaborski et al.
(Continued)

FOREIGN PATENT DOCUMENTS

EP   1873715   1/2008
EP   1873717   1/2008
(Continued)

OTHER PUBLICATIONS

Nikolaidis et al., "Image and Video Fingerprinting for Digital Rights Management of Multimedia Data," 2006 International Symposium on Intelligent Signal Processing and Communication Systems (ISPACS2006), Tottori, Japan (7 pages).
(Continued)

*Primary Examiner* — Duy M Dang
(74) *Attorney, Agent, or Firm* — Hanley, Flight & Zimmerman, LLC

(57) ABSTRACT

Methods, apparatus and articles of manufacture for image comparison using color histograms are disclosed. Example methods disclosed herein to compare images include adjusting a color histogram associated with an input image based on a first reference color histogram associated with a first reference image to determine a first adjusted color histogram associated with the input image. Such example methods also include comparing the first adjusted color histogram and the first reference color histogram to determine whether the first reference image matches the input image. Such example methods further include displaying a version of the first reference image adjacent to a display of the input image in response to determining that the first reference image matches the input image.

20 Claims, 9 Drawing Sheets

(51) Int. Cl.
*G06K 9/32* (2006.01)
*G06F 17/30* (2006.01)

(58) Field of Classification Search
USPC .......... 382/164, 165, 170, 305; 345/88, 690; 348/700, 722; 725/19; 709/224
See application file for complete search history.

(56) References Cited

U.S. PATENT DOCUMENTS

| | | | |
|---|---|---|---|
| 5,546,475 | A | 8/1996 | Bolle et al. |
| 5,594,807 | A | 1/1997 | Liu |
| 5,708,767 | A | 1/1998 | Yeo et al. |
| 5,767,893 | A | 6/1998 | Chen et al. |
| 5,805,733 | A | 9/1998 | Wang et al. |
| 5,821,945 | A | 10/1998 | Yeo et al. |
| 5,956,026 | A | 9/1999 | Ratakonda |
| 5,990,980 | A | 11/1999 | Golin |
| 6,157,744 | A | 12/2000 | Nagasaka et al. |
| 6,185,314 | B1 | 2/2001 | Crabtree et al. |
| 6,243,713 | B1 | 6/2001 | Nelson et al. |
| 6,263,088 | B1 | 7/2001 | Crabtree et al. |
| 6,278,989 | B1 | 8/2001 | Chaudhuri et al. |
| 6,366,680 | B1 | 4/2002 | Brunk et al. |
| 6,430,312 | B1 | 8/2002 | Huang et al. |
| 6,556,710 | B2 | 4/2003 | Pass et al. |
| 6,611,622 | B1 | 8/2003 | Krumm |
| 6,675,174 | B1 | 1/2004 | Bolle et al. |
| 6,708,167 | B2 | 3/2004 | Lee et al. |
| 6,721,447 | B1 | 4/2004 | Kim et al. |
| 6,724,915 | B1 | 4/2004 | Toklu et al. |
| 6,741,655 | B1 | 5/2004 | Chang et al. |
| 6,782,125 | B2 | 8/2004 | Lee et al. |
| 6,782,127 | B1 | 8/2004 | Lee et al. |
| 6,810,145 | B2 | 10/2004 | Briand et al. |
| 6,940,545 | B1 | 9/2005 | Ray et al. |
| 6,941,321 | B2 | 9/2005 | Schuetze et al. |
| 6,944,332 | B1 | 9/2005 | Brechner |
| 7,003,518 | B2 | 2/2006 | Lee et al. |
| 7,051,271 | B1 | 5/2006 | Chiu et al. |
| 7,103,222 | B2 | 9/2006 | Peker |
| 7,170,566 | B2 | 1/2007 | McGee et al. |
| 7,203,366 | B2 | 4/2007 | Miyatake et al. |
| 7,283,668 | B2 | 10/2007 | Moon et al. |
| 7,340,096 | B2 | 3/2008 | Stauder et al. |
| 7,376,271 | B2 | 5/2008 | Lee et al. |
| 7,411,698 | B2 | 8/2008 | Gallina |
| 7,756,299 | B2 | 7/2010 | Higaki |
| 8,004,576 | B2 | 8/2011 | Sharma |
| 8,897,553 | B2 * | 11/2014 | Lee ............... G06K 9/3241 382/165 |
| 8,897,554 | B2 * | 11/2014 | Lee ............... G06K 9/00758 382/165 |
| 9,158,993 | B2 * | 10/2015 | Lee ............... G06K 9/00758 |
| 2002/0021836 | A1 | 2/2002 | Lee et al. |
| 2004/0133927 | A1 | 7/2004 | Sternberg et al. |
| 2004/0218837 | A1 | 11/2004 | Shiyama |
| 2005/0093795 | A1 * | 5/2005 | Lin ............... H04N 5/20 345/88 |
| 2005/0172312 | A1 | 8/2005 | Lienhart et al. |
| 2006/0187358 | A1 | 8/2006 | Lienhart et al. |
| 2006/0195860 | A1 | 8/2006 | Eldering et al. |
| 2006/0242667 | A1 | 10/2006 | Petersen et al. |
| 2006/0248569 | A1 | 11/2006 | Lienhart et al. |
| 2008/0059899 | A1 | 3/2008 | Gemmell et al. |
| 2008/0068622 | A1 | 3/2008 | Deng et al. |
| 2008/0226173 | A1 | 9/2008 | Yuan et al. |
| 2009/0125510 | A1 | 5/2009 | Graham et al. |
| 2009/0198599 | A1 | 8/2009 | Hui et al. |
| 2010/0177234 | A1 | 7/2010 | Ogura et al. |
| 2010/0226574 | A1 | 9/2010 | Omori |
| 2010/0316290 | A1 | 12/2010 | Jia |
| 2011/0221920 | A1 | 9/2011 | Gwak |
| 2011/0268320 | A1 | 11/2011 | Huang et al. |
| 2013/0148882 | A1 | 6/2013 | Lee |
| 2013/0148883 | A1 | 6/2013 | Lee |
| 2013/0148884 | A1 | 6/2013 | Lee |
| 2014/0233852 | A1 | 8/2014 | Lee |

FOREIGN PATENT DOCUMENTS

| | | |
|---|---|---|
| GB | 2349031 | 10/2000 |
| WO | 9967695 | 12/1999 |

OTHER PUBLICATIONS

United States Patent and Trademark Office, "Non-Final Office Action", issued in connection with U.S. Appl. No. 13/324,692, dated Mar. 13, 2014 (6 pages).

United States Patent and Trademark Office, "Non-Final Office Action", issued in connection with U.S. Appl. No. 13/324,695, dated Aug. 20, 2013 (12 pages).

United States Patent and Trademark Office, "Notice of Allowance", issued in connection with U.S. Appl. No. 13/324,695, dated Jan. 10, 2014 (5 pages).

United States Patent and Trademark Office, "Non-Final Office Action", issued in connection with U.S. Appl. No. 14/263,501 dated Jun. 26, 2014 (5 pages).

United States Patent and Trademark Office, "Notice of Allowance", issued in connection with U.S. Appl. No. 13/324,692, dated Jul. 21, 2014 (7 pages).

United States Patent and Trademark Office, "Notice of Allowance", issued in connection with U.S. Appl. No. 14/263,501, dated Oct. 8, 2014 (5 pages).

United States Patent and Trademark Office, "Non-Final Office Action", issued in connection with U.S. Appl. No. 13/324,624, dated Feb. 27, 2014 (6 pages).

United States Patent and Trademark Office, "Notice of Allowance", issued in connection with U.S. Appl. No. 13/324,624, dated Jul. 8, 2014 (9 pages).

United States Patent and Trademark Office, "Corrected Notice of Allowance", issued in connection with U.S. Appl. No. 13/324,624, dated Oct. 8, 2014 (2 pages).

United States Patent and Trademark Office, "Corrected Notice of Allowance", issued in connection with U.S. Appl. No. 13/324,624, dated Oct. 22, 2014 (2 pages).

United States Patent and Trademark Office, "Corrected Notice of Allowance", issued in connection with U.S. Appl. No. 13/324,624, dated Oct. 29, 2014 (2 pages).

United States Patent and Trademark Office, "Non-Final Office Action", issued in connection with U.S. Appl. No. 14/875,318, dated Nov. 20, 2015 (7 pages).

* cited by examiner

IMAGE COMPARISON USING COLOR HISTOGRAMS

RELATED APPLICATION(S)

This patent arises from a continuation of U.S. patent application Ser. No. 13/324,624 (now U.S. Pat. No. 8,897, 553), entitled "IMAGE COMPARISON USING COLOR HISTOGRAMS" and filed on Dec. 13, 2011. U.S. patent application Ser. No. 13/324,624 is hereby incorporated by reference in its entirety.

FIELD OF THE DISCLOSURE

This disclosure relates generally to comparing images and, more particularly, to image comparison using color histograms.

BACKGROUND

Image processing techniques for comparing images can have many practical applications. For example, image comparison techniques that compare an input, or test, image to one or more reference images can be applied to the detection and identification of advertisements in printed and/or broadcast media, the recognition of products in printed media and/or on store shelves, the verification of product placements in television programming, etc. A challenge faced by image comparison techniques is to reliably identify matching images in the presence of image distortion.

DETAILED DESCRIPTION

Figure 1:
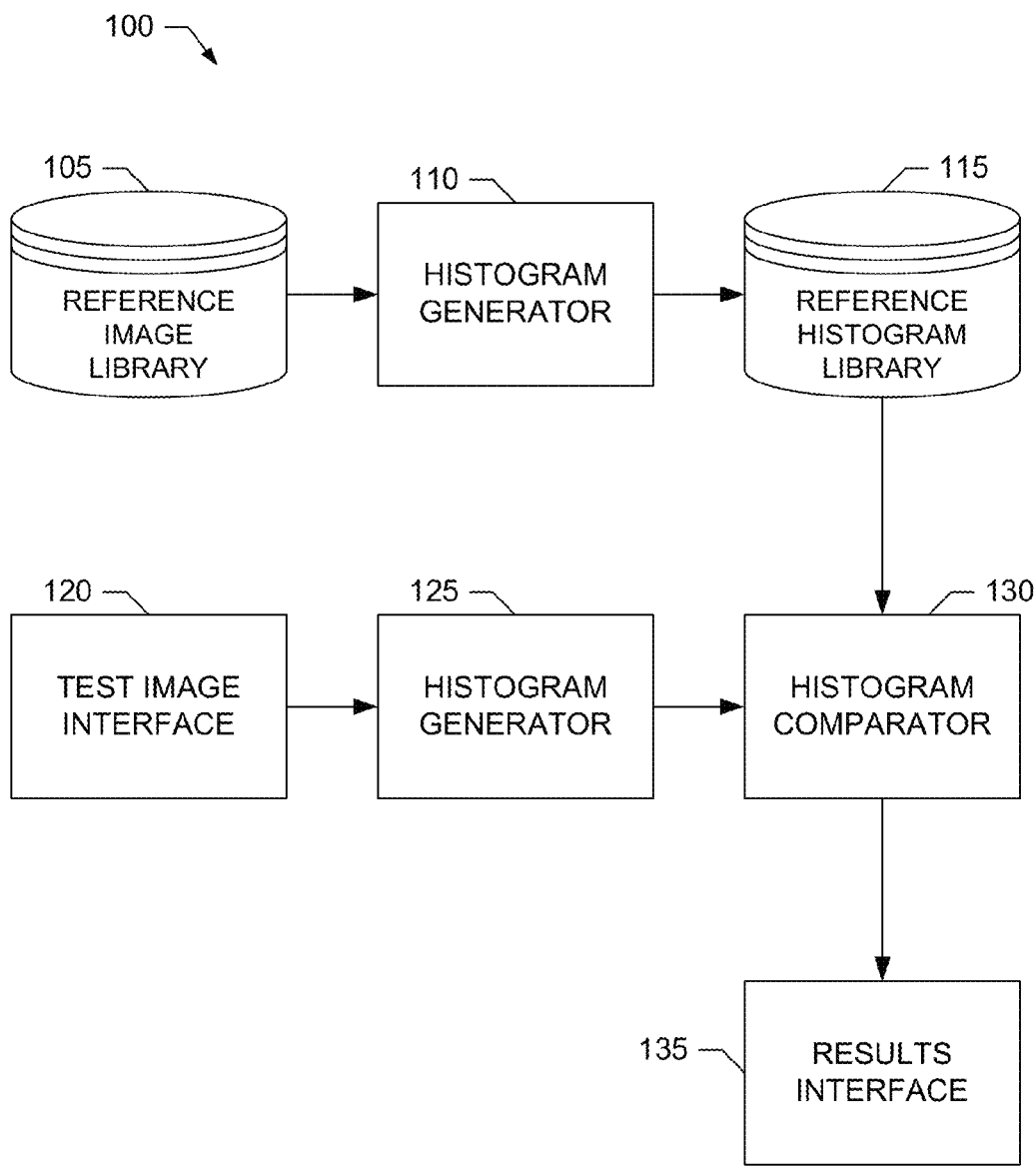
FIG. 1 is a block diagram of an example image comparison system for comparing images using color histograms as disclosed herein.

Methods, apparatus and articles of manufacture for image comparison using color histograms are disclosed herein. In general, a color histogram for an image includes a set of bins (also referred to herein as color bins) representing a respective set of possible colors that may be included in the image. For example, a particular bin corresponding to a particular color (or, in other words, a particular color bin) can have a bin value representing a count of the number of pixels of the image (or a sampled version/subset of the image) having that particular color. In some examples, the color histogram for an image can be stored in a data format that may be used as a signature (e.g., a unique or substantially unique proxy) representative of the image. In such examples, the color histogram for an image may be referred to as the image's color histogram signature.

An example method disclosed herein to compare a first image and a second image using color histograms includes obtaining a first color histogram for a first set of pixels sampled from the first image (e.g., a reference image), and obtaining a second color histogram for a second set of pixels sampled from the second image (e.g., a test image, also referred to herein as an input image). The disclosed example method also includes determining a comparison metric based on differences between bin values of the first color histogram and adjusted bin values of the second color histogram. The disclosed example method further includes determining whether the first image and the second image match based on the comparison metric.

As described in detail below, the first set of pixels sampled from the first image and forming the basis of the first color histogram can include all or a subset of the pixels in the first image. In examples where the first set of pixels includes a subset of the pixels in the first image, the first set of pixels can be obtained by, for example, sampling uniformly-spaced pixels of the first image, or randomly sampling pixels of the first image. Similarly, the second set of pixels sampled from the second image and forming the basis of the second color histogram can include all or a subset of the pixels in the second image, where the subset of pixels can be obtained by, for example, sampling uniformly-spaced pixels of the second image, or randomly sampling pixels of the second image. In some examples, the first set of pixels and the second set of pixels can be sampled using different types of sampling (e.g., uniform vs. random sampling).

In some examples, the disclosed example method determines the adjusted bin values of the second color histogram (for use in determining the comparison metric) by scaling bin values of the second color histogram by a scale factor (e.g., such as a scale factor of 2 or another value) to determine scaled bin values of the second color histogram. The example method then determines an adjusted bin value of the second color histogram for a particular color bin to be a smaller (e.g., minimum) of a scaled bin value of the second color histogram for the particular color bin or a respective bin value of the first color histogram for the particular color bin. In some examples, the method determines the comparison metric by determining the differences between the bin values of the first color histogram and the respective adjusted bin values of the second color histogram, and summing the differences to determine the comparison metric.

In some examples, the disclosed example method determines that the first image and the second image match when the comparison metric is less than or equal to a threshold. In some examples in which the first image is included in a set of reference images, the disclosed example method further includes determining a set of comparison metrics corresponding to comparing respective ones of the set of reference images with the second image. Each such comparison metric is based on differences between bin values of a respective reference color histogram for a respective reference image and respective adjusted bin values of the second color histogram that are determined based on scaled bin values of the second color histogram and the bin values of the respective reference color histogram. Such an example method also includes identifying a minimum comparison metric among the set of comparison metrics and determining that the first image and the second image match when the minimum comparison metric is a first comparison metric corresponding to comparing the first image and the second image, and the minimum comparison metric is less than or equal to a threshold.

As noted above, image processing techniques for comparing images can have many practical applications. However, prior image comparison techniques can be prone to error, such as erroneously determining that two non-matching images match (e.g., a false match detection) or that two matching images do not match (e.g., a missed match detection), when one or more of the images being compared have been distorted. Examples of image distortion include, but are not limited to, image corruption by noise, image cropping, image reduction in the horizontal and/or vertical dimension(s), combining the image in a scene containing other image objects, etc. Unlike such prior color-based image comparison techniques, image comparison using color histograms as disclosed herein can yield reliable matching results in the presence of such image distortion.

Turning to the figures, a block diagram of an example image comparison system 100 that may be used to compare images using color histograms in accordance with the example methods, apparatus and articles of manufacture disclosed herein is illustrated in FIG. 1. The image comparison system 100 includes an example reference image library 105 that stores a set of one or more reference images for comparison with a test image, also referred to herein as an input image. The reference image(s) stored in the reference image library 105 can correspond to any type(s) of image(s) obtained from any type(s) of source(s). For example, the reference images stored in the reference image library can include images of advertisements captured from printed and/or broadcast media, images of products captured from print media and/or photographs of store shelves, images of product placements observed in television programming, etc. The reference image library 105 can correspond to any type or combination of temporary and/or permanent tangible storage media, such as one or more of cache, volatile memory, flash memory, disk storage, etc., including but not limited to one or more of the mass storage devices 1130 and/or volatile memory 1118 in the example processing system 1100 of FIG. 11, which is described in greater detail below.

The image comparison system 100 of the illustrated example also includes an example histogram generator 110 to generate a respective reference color histogram for each reference image included in the set of reference images stored in the reference image library 105. The resulting set of one or more reference color histograms generated by the histogram generator 110 are stored in an example reference histogram library 115 included in the image comparison system 100. For example, a reference color histogram generated by the histogram generator 110 for a particular reference image includes a set of bins (also referred to herein as color bins) representing a respective set of possible colors that may be included in the reference image. For a particular bin corresponding to a particular color (or, in other words, a particular color bin), the histogram generator 110 determines a bin value for the color bin that represents a count of the number of pixels of the particular reference image (or a sampled version/subset of the reference image) having the particular color associated with the color bin. The reference histogram library 115 used to store the set of reference color histograms generated by the histogram generator 110 can correspond to any type or combination of temporary and/or permanent tangible storage media, such as one or more of cache, volatile memory, flash memory, disk storage, etc., including but not limited to one or more of the mass storage devices 1130 and/or volatile memory 1118 in the example processing system 1100 of FIG. 11, which is described in greater detail below. Furthermore, the reference image library 105 and the reference histogram library 115 can be implemented by the same or different storage media.

In the example of FIG. 1, the image comparison system 100 uses the set of reference histograms stored in the reference histogram library 115 to compare the set of reference images stored in the reference image library 105 with a test image (also referred to herein as an input image) obtained via an example test image interface 120. For example, the image comparison system 100 determines whether the test image obtained via the test image interface 120 matches one or more references images stored in the reference image library 105 and, if so, identifies the one or more matching references images and/or the best matching reference image. The test image interface 120 can be implemented by, for example, a camera or other image sensing device to capture an image of a real-world scene (e.g., store shelf, billboard, store window advertisement, etc.), an image of a printed publication placed in the viewing field of the camera/imaging device, an image of a display of a multimedia presentation device (e.g., a television, computer monitor, smartphone, etc.) in the viewing field of the camera/imaging device, etc. Additionally or alternatively, the test image interface 120 can be implemented by a scanner to scan printed images for comparison with the set of reference images in the reference image library 105. Additionally or alternatively, the test image interface 120 can be implemented by a framegrabber or other video capturing device to capture frames of video for comparison with the set of reference images in the reference image library 105. Additionally or alternatively, the test image interface 120 can be implemented by a computer or other processing device configured to obtain test images from one or more network sources (e.g., servers) communicatively coupled to the test image interface 120 (e.g., via the Internet and/or one or more other networks).

Figure 2:
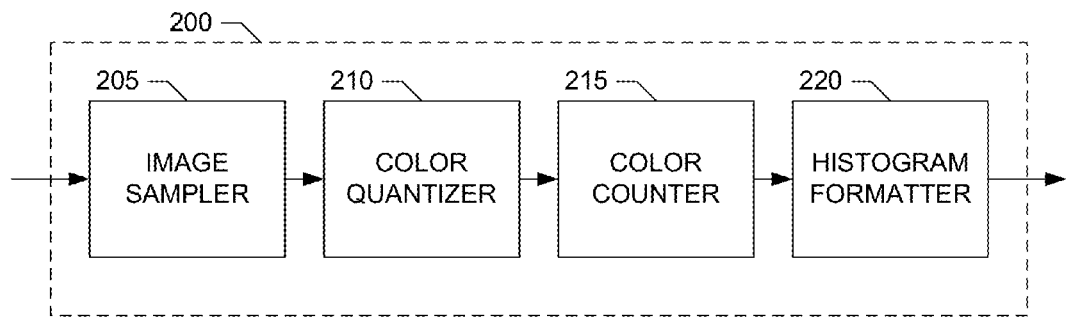
FIG. 2 is a block diagram of an example histogram generator for generating color histograms in the example image comparison system of FIG. 1.

The image comparison system 100 of the illustrated example further includes an example histogram generator 125 to generate a color histogram for the test image obtained from the test image interface 120. As such, the color histogram generated by the histogram generator 125 for the test image is also referred to herein as the test color histogram. Similar to the reference color histogram(s) generated by the histogram generator 110, a test color histogram generated by the histogram generator 125 for the test image includes a set of bins (e.g., color bins) representing a respective set of possible colors that may be included in the test image. For a particular bin corresponding to a particular color (e.g., for a particular color bin), the histogram generator 125 determines a bin value for the color bin that represents a count of the number of pixels of the test image (or a sampled version/subset of the test image) having the particular color associated with the color bin. In some examples, the histogram generators 110 and 125 may be implemented by the same histogram generator, whereas in other examples, the histogram generators 110 and 125 may be implemented by different histogram generators. An example implementation of the histogram generators 110 and 125 is illustrated in FIG. 2, which is described in greater detail below.

The example image comparison system 100 of FIG. 1 includes an example histogram comparator 130 to compare the test color histogram generated by the histogram generator 125 for the test image with the set of reference color histograms stored in the reference histogram library 115 for the set of reference images to be compared with the test image. In the illustrated example, the histogram comparator 130 determines a respective comparison metric that quantifies the results of comparing a particular reference image with the test image, resulting in a set of comparison metrics corresponding respectively to the set of reference images. For example, the histogram comparator 130 determines a comparison metric for a particular reference image based on differences between bin values of the reference color histogram for the particular reference image and adjusted bin values of the test color histogram. As described in greater detail below, the histogram comparator 130 determines adjusted bin values of the test color histogram based on comparing scaled bin values of the test color histogram with the bin values of the reference color histogram for the particular reference image. Because the adjusted bin values are determined based on the bin values of the particular reference color histogram, the histogram comparator 130 may determine different test histogram adjusted bin values for each (or some of) the different comparison metrics.

Adjustment of test color histogram bin values, as described in greater detail below, can permit the image comparison system 100 to identify matching images even when the color histograms for the images are different if, for example, the respective bin values of the two color histograms for the color bins are within a scale factor of each other. Such adjustment of the bin values of the test color histogram can improve the image comparison accuracy and robustness of the image comparison system 100 in the presence of image distortion, such as image corruption by noise, image cropping, image reduction in the horizontal and/or vertical dimension(s), combining of images in scenes containing other image objects, etc. In some examples, the scale factor is used to determine the scaled bin values of the test color histogram (from which the adjusted bin values are determined). In such examples, the scale factor can be specified as a variable input parameter to the image comparison system 100 (e.g., to trade-off false matching vs. missed matching results during system operation). Additionally or alternatively, the scale factor can be a configuration parameter that is set during initialization of the image comparison system 100.

The histogram comparator 130 of the illustrated example also processes the set of comparison metrics to determine whether the test image obtained via the test image interface 120 matches a reference image stored in the reference image library 105. For example, the histogram comparator 130 may determine that the test image matches a reference image stored in the reference image library 105 if the comparison metric associated with the reference image is less than or equal to a threshold. In some examples, the histogram comparator 130 identifies a minimum comparison metric among the set of comparison metrics and determines that the test image matches the particular reference image associated with the minimum comparison metric if the minimum comparison metric is less than or equal to the threshold. In some examples, the histogram comparator 130 identifies any reference image associated with a respective comparison metric that is less than or equal to the threshold as a potential match of the test image. In some examples, the threshold can be specified as a variable input parameter to the image comparison system 100 (e.g., to trade-off false matching vs. missed matching results during system operation). Additionally or alternatively, the threshold can be a configuration parameter that is set during initialization of the image comparison system 100.

In the illustrated example of FIG. 1, the image comparison system 100 further includes an example results interface 135 to provide the results of comparing the test image obtained via the test image interface 120 to the set of reference images stored in the reference image library 105. For example, the results interface 135 reports or otherwise outputs the image comparison results using any appropriate data format for presentation to a user and/or sending to a receiving device. For example, the results interface 135 indicates whether the test image has been determined to match any reference images(s) stored in the reference image library 105 and, if so, the results interface 135 identifies the matching reference image(s). In some examples, the results interface 135 also reports the comparison metric(s) associated with the matching reference image(s). Additionally or alternatively, in some examples, the results interface 135 can provide the matching reference image(s) (or a thumbnail version of the matching reference image(s)), possibly in a side-by-side or similar presentation with the input test image.

A block diagram of an example histogram generator 200 that may be used to implement either or both of the histogram generators 110 and/or 125 of FIG. 1 is illustrated in FIG. 2. The histogram generator 200 of the illustrated example includes an example image sampler 205 to sample an input image (e.g., such as the test image or a reference image described above) to determine a set of pixels of the image. For example, the image sampler 205 can sample a subset or all of the pixels of the image to obtain the set of pixels from which the image's color histogram is to be determined. In some examples, the image sampler 205 employs uniform sampling to sample a number of pixels (e.g., such as 1000 or some other number) that are uniformly-spaced in the input image (e.g., and that form a uniformly spaced grid of pixels in the image) to obtain the sampled set of pixels of the image. In other examples, the image sampler 205 employs random sampling to randomly sample a number of pixels (e.g., such as 1000 or some other number) in the input image to obtain the sampled set of pixels of the image. In some examples, the image sampler 205 can be omitted and all of the pixels of the image are included in the set of pixels processed by the histogram generator 200 to determine the image's color histogram.

The histogram generator 200 of FIG. 2 also includes an example color quantizer 210 to quantize the color values of the pixels in the set of pixels of the input image. Each pixel of the image is associated with a set of color values, such as three color values corresponding to a red color value, a green color value and a blue color value. In the illustrated example, the color quantizer 210 quantizes each color value of a pixel into a set of levels. For example, the color quantizer 210 may use any appropriate quantization technique to quantize the red color value of each pixel into R intensity levels, the green color value of each pixel into G intensity levels, and the blue color value of each pixel into B intensity levels. The values of R, G and B can be the same or different, and may be variable input parameters and/or initial configuration parameters of the histogram generator 200.

The number of levels into which the color quantizer 210 quantizes each color value determines the resulting number of possible color combinations that can be represented by the quantized pixels, which corresponds to the number of color bins of the color histogram determined by the histogram generator 200. In other words, the aforementioned quantization of the red, green and blue color values yields R×G×B color combinations and, thus, the color histogram determined by the histogram generator 200 of the illustrated example has R×G×B color bins. For example, if R=G=B=8, then the total number of possible color combinations and, thus, the total number of color bins is 8×8×8=512. Color quantization as performed by the color quantizer 210 can reduce processing requirements and improve image matching robustness, such as in circumstances in which small color variations between images occur due to, for example, image smoothing and/or other processing of the test and/or reference images.

In other examples, the quantized color values of a particular pixel are combined (e.g., concatenated) with the quantized color values of one or more other pixels in a neighborhood of the particular pixel to determine the quantized color combination for the particular pixel. The value of the quantized color combination for the particular pixel (e.g., the value obtained by combining the quantized color values of the particular pixel with those of the neighboring pixel(s)) then determines the histogram color bin in which the pixel is to be included. Like before, the resulting number of possible color combinations that can be represented by the combination of quantized pixels in a neighborhood corresponds to the number of color bins of the color histogram determined by the histogram generator 200. In other words, if the quantized color values of a particular pixel are combined with the quantized color values of N−1 neighboring pixels, then the number of possible color combinations associated with combining the neighboring quantized pixels and, thus, the number if color histogram bins is $(R \times G \times B)^N$. For example, if R=G=B=2 (corresponding to binary, or 1 bit, quantization) and the quantized color values of a particular pixel are combined with the quantized color values of a first neighbor pixel located a first number (e.g., 5 or some other number) of pixels up from the particular pixel and a second neighbor pixel located a second number (e.g., 5 or some other number) of pixels to the left of the particular pixel, then the total number of possible color combinations for the combination of a pixel with its N−1 neighboring pixels and, thus, the total number of color bins is $(2 \times 2 \times 2)^3 = 512$.

In the illustrated example, the histogram generator 200 includes an example color counter 215 to count the numbers of times each possible quantized color combination appears in the sampled set of pixels of the input image. For example, the color counter 215 can store each possible color combination that can be exhibited by the quantized pixels as a respective element of a data array (e.g., with the integer value of a particular color combination forming the index for its respective element in the data array). In such an example, the color counter 215 increments the values of the array elements to count the numbers of times each different color combination appears in the quantized set of pixels. The resulting counts of the different color combinations appearing in the quantized set of pixels of the input image forms the color histogram of the input image.

An example histogram formatter 220 is included in the histogram generator 220 to format the color histogram determined by the image sampler 205, the color quantizer 210 and the color counter 215 for subsequent processing. For example, the histogram formatter 220 may output a data array in which each element is indexed by a respective possible color combination and in which the element values correspond to the counts of the different color combinations appearing in the image. In some examples, the histogram formatter 220 may format the data array into a numeric value that may be used as a signature or, in other words, a color histogram signature, of the input image. For example, the histogram formatter 220 may concatenate the bin values of the data array representing the image's color histogram into a numeric value (e.g., such as a binary value) forming the color histogram signature of the input image.

Figure 3:
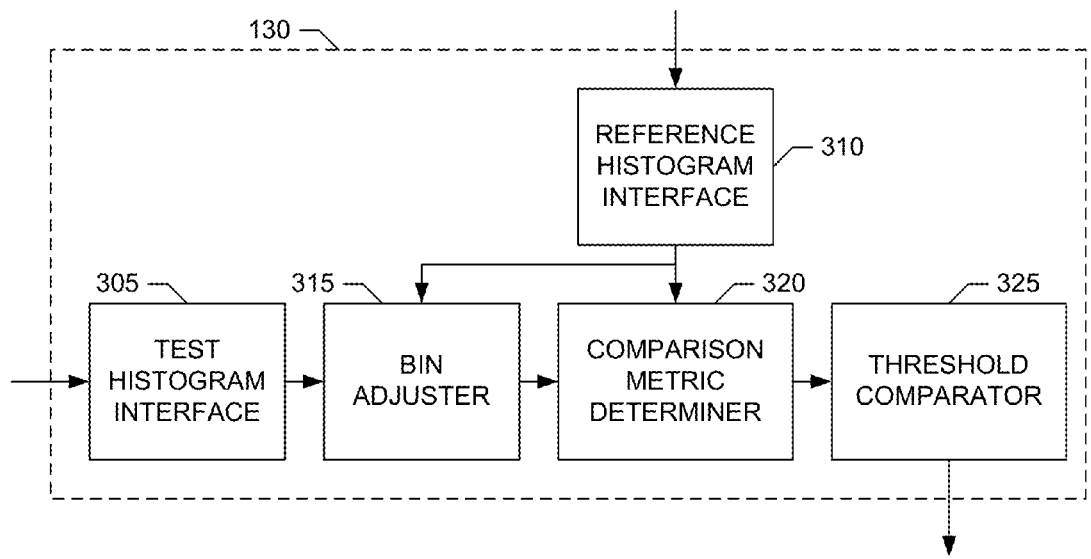
FIG. 3 is a block diagram of an example histogram comparator for comparing color histograms in the example image comparison system of FIG. 1.

A block diagram of an example implementation of the histogram comparator 130 of FIG. 1 is illustrated in FIG. 3. The histogram comparator 130 of FIG. 3 includes an example test histogram interface 305 to obtain a color histogram of a test image (also referred to herein as the test color histogram) that is to be compared with a color histogram of a reference image (also referred to herein as the reference color histogram) obtained via an example reference histogram interface 310. For example, the histogram interface 305 may receive the test color histogram from the histogram generator 125, and the reference histogram interface 310 may receive the reference color histogram from the histogram generator 110 and/or the reference histogram library 115. The histogram interface 305 and the reference histogram interface 310 can be implemented by any type(s) of data interface(s), communication bus(ses), function(s), module(s), etc., capable of receiving the color histograms and/or color histogram signatures from the histogram generators 110, 125 and/or 200.

The example histogram comparator 130 of FIG. 3 also includes an example bin adjuster 315 to determine adjusted bin values of the test color histogram that are based on the bin values of the reference color histogram and a scale factor. In the illustrated example, the bin adjuster 315 determines the adjusted bin values of the test color histogram by scaling bin values of the test color histogram by a scale factor (e.g., such as a scale factor of 2 or another value) to determine scaled bin values of the test color histogram. As noted above, the scale factor can be a variable input parameter, a configuration parameter set during initialization, etc. Using the scaled bin values, the bin adjuster 315 compares the scaled bin values of the test color histogram to the respective bin values of the reference color histogram to determine the adjusted bin values of the test color histogram.

For example, the bin adjuster 315 can determine an adjusted bin value of the test color histogram to be the smaller of the respective scaled bin value of the test color histogram or the respective bin value of the reference color histogram. Mathematically, such an adjusted bin value for a particular color combination C in the test color histogram can be determined using Equation 1, which is:

AdjustedHistogramTestImage[C]=min{K×HistogramTestImage[C], HistogramRefImage[C]}.   Equation 1

Figure 4:
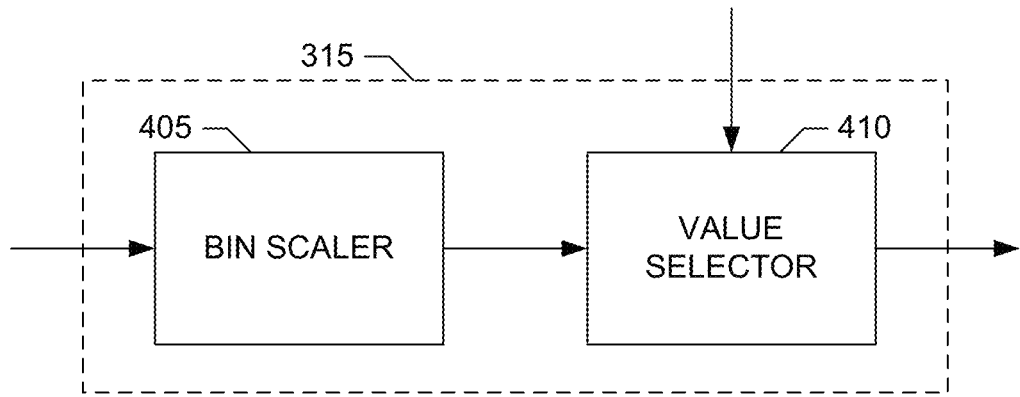
FIG. 4 is a block diagram of an example bin adjuster that may be used to implement the example histogram comparator of FIG. 3.

In Equation 1, HistogramTestImage[C] corresponds to the bin value for the color combination C in the test color histogram, HistogramRefImage[C] corresponds to the bin value for the color combination C in the reference color histogram, K is the scale factor used to scale the bin values of the test color histogram to determine the scaled bin values, min{ } is a function that selects a minimum value from a set of input values, and AdjustedHistogramTestImage [C] is the resulting adjusted bin value for the color combination C in the test color histogram. An example implementation of the bin adjuster 315 is illustrated in FIG. 4, which is described in greater detail below.

The illustrated example histogram comparator 130 of FIG. 3 further includes an example comparison metric determiner 320 to determine a comparison metric based on differences between bin values of the reference color histogram and the adjusted bin values of the test color histogram. In some examples, the metric determiner 320 determines the comparison metrics by determining the differences between the bin values of the reference color histogram and the respective adjusted bin values of the test color histogram for the same color combinations and summing the differences to determine the comparison metric. In such examples, the difference between the bin value for the color combination C in the reference color histogram and the respective adjusted bin value for the color combination C in the test color histogram can be represented mathematically as the quantity Difference[C] and determined using Equation 2, which is:

Difference[C]=HistogramRefImage[C]−min{K× HistogramTestImage[C], HistogramRefImage[C]}.   Equation 2

Using Equation 2, the comparison metric can be represented mathematically as the quantity ComparisonMetric and determined mathematically by summing the differences between the bin values of the reference color histogram and the respective adjusted bin values of the test color histogram in accordance with Equation 3, which is:

ComparisonMetric=sum$_C${Difference[C]}= sum$_C${HistogramRefImage[C]−min{K× HistogramTestImage[C], HistogramRefImage[C]}}.   Equation 3

Figure 5:
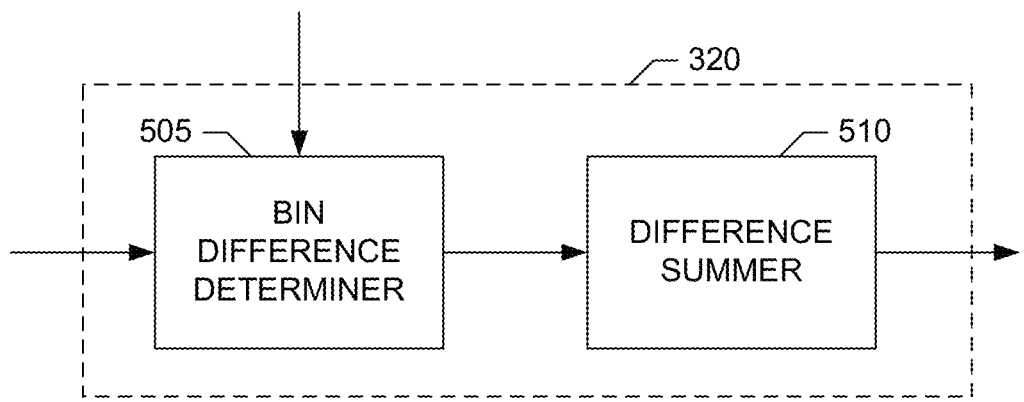
FIG. 5 is a block diagram of an example comparison metric determiner that may be used to implement the example histogram comparator of FIG. 3.

In Equation 3, sum$_C${ } denotes the sum over the set of possible color combinations {C} represented by the test and reference color histograms. An example implementation of the comparison metric determiner 320 is illustrated in FIG. 5, which is described in greater detail below.

In some examples, the bin adjuster 315 and the comparison metric determiner 320 determine a set of comparison metrics corresponding to comparing a set of reference color histograms associated with a respective set of reference images to the test color histogram for the test image. In such examples, the bin adjuster 315 may use Equation 1 to determine different adjusted bin values of the test color histogram for comparison with different reference color histograms (because adjusted bin values of the test color histogram depend on the bin values of the reference color histogram with which the test color histogram is being compared). Furthermore, in such examples, the comparison metric determiner 320 may determine the minimum comparison metric from among the set of comparison metrics and identify the particular reference image corresponding to this minimum comparison metric as being the most likely match to the test image.

An example threshold comparator 325 is included in the example histogram comparator 130 of FIG. 3 to compare the comparison metric(s) obtained from the comparison metric determiner 320 to a threshold to determine whether the reference image(s) associated with the comparison metric(s) match the test image. As noted above, the threshold can be a variable input parameter, a configuration parameter set during initialization, etc. In examples in which the comparison metric determiner 320 provides one comparison metric (e.g., corresponding to comparing the test image to one reference image or selecting the minimum comparison metric to identify the most likely matching reference image), the threshold comparator 325 indicates that the particular reference image associated with the comparison metric is a match to the test image if the comparison metric is less than or equal to the threshold. Otherwise, if the comparison metric is greater than the threshold, the threshold comparator 325 indicates that this particular reference image is not a match to the test image. In examples in which the comparison metric determiner 320 provides multiple comparison metrics, the threshold comparator 325 identifies reference image(s) associated with respective comparison metric(s) that is(are) less than or equal to the threshold as potential match(es) of the test image.

A block diagram of an example implementation of the bin adjuster 315 of FIG. 3 is illustrated in FIG. 4. The example bin adjuster 315 of FIG. 4 includes an example bin scaler 405 and an example value selector 410. In the illustrated example, the bin scaler 405 determines the scaled bin values of the test color histogram by scaling the test color histogram's bin values by the scale factor, as described above. For example, the bin scaler 405 can determine the adjusted bin value for a particular color combination C in the test color histogram to be K×HistogramTestImage[C], where HistogramTestImage[C] corresponds to the bin value for the color combination C in the test color histogram, and K is the scale factor used to scale the bin values of the test color histogram to determine the scaled bin values.

The value selector 410 of the illustrated example determines the adjusted bin values of the test color histogram to be the smaller of the scaled bin values of the test color histogram as determined by the bin scaler 405 or the respective bin values of the reference color histogram, as described above. For example, the value selector 410 can use Equation 1, which is described above, to select the adjusted bin value, AdjustedHistogramTestImage[C], for the color combination C in the test color histogram to be the minimum of either the scaled bin value, K×HistogramTestImage[C], for this color combination C in the test color histogram or the respective bin value, HistogramRefImage[C], for this color combination C in the reference color histogram.

A block diagram of an example implementation of the comparison metric determiner 320 of FIG. 3 is illustrated in FIG. 5. The example comparison metric determiner 320 of FIG. 5 includes an example bin difference determiner 505 and an example difference summer 510. In the illustrated example, the bin difference determiner 505 determines the differences between bin values of the reference color histogram and respective adjusted bin values of the test color histogram for the same color combinations. For example, the bin difference determiner 505 can use Equation 2, which is described above, to determine, for each color combination C, the respective difference, Difference[C], between the bin value for the color combination C in the reference color histogram and the respective adjusted bin value for the color combination C in the test color histogram.

The difference summer 510 of the illustrated example determines the sum of the differences obtained from the bin difference determiner 505. For example, the difference summer 510 can use Equation 3, which is described above, to determine the sum, $\text{sum}_C\{\ \}$, of the differences, Difference[C], over the set of possible color combinations $\{C\}$. In the illustrated example, this sum forms the comparison metric that quantifies the result of comparing the test image and respective reference image, as described above.

While example manners of implementing the image comparison system 100 have been illustrated in FIGS. 1-5, one or more of the elements, processes and/or devices illustrated in FIGS. 1-5 may be combined, divided, re-arranged, omitted, eliminated and/or implemented in any other way. Further, the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505, the example difference summer 510 and/or, more generally, the example image comparison system 100 of FIGS. 1-5 may be implemented by hardware, software, firmware and/or any combination of hardware, software and/or firmware. Thus, for example, any of the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505, the example difference summer 510 and/or, more generally, the example image comparison system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example image comparison system 100, the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505 and/or the example difference summer 510 are hereby expressly defined to include a tangible computer readable medium such as a memory, digital versatile disk (DVD), compact disk (CD), Blu-ray Disc™, etc., storing such software and/or firmware. Further still, the example image comparison system 100 as illustrated in FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example image comparison system 100, the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505 and/or the example difference summer 510 are shown in FIGS. 6-10. In these examples, the machine readable instructions represented by each flowchart may comprise one or more programs for execution by a processor, such as the processor 1112 shown in the example processing system 1100 discussed below in connection with FIG. 11. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 1112, but the entire program or programs and/or portions thereof could alternatively be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-10 may be implemented manually. Further, although the example machine readable instructions are described with reference to the flowcharts illustrated in FIGS. 6-10, many other methods of implementing the example image comparison system 100, the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505 and/or the example difference summer 510 may alternatively be used. For example, with reference to the flowcharts illustrated in FIGS. 6-10, the order of execution of the blocks may be changed, and/or some of the blocks described may be changed, eliminated, combined and/or subdivided into multiple blocks.

As mentioned above, the example processes of FIGS. 6-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). The tangible computer readable medium can be local to and/or remote from the processor(s), device(s), apparatus, etc., that is/are to execute the coded instructions. As used herein, the term tangible computer readable medium is expressly defined to include any type of computer readable storage and to exclude propagating signals. Additionally or alternatively, the example processes of FIGS. 6-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
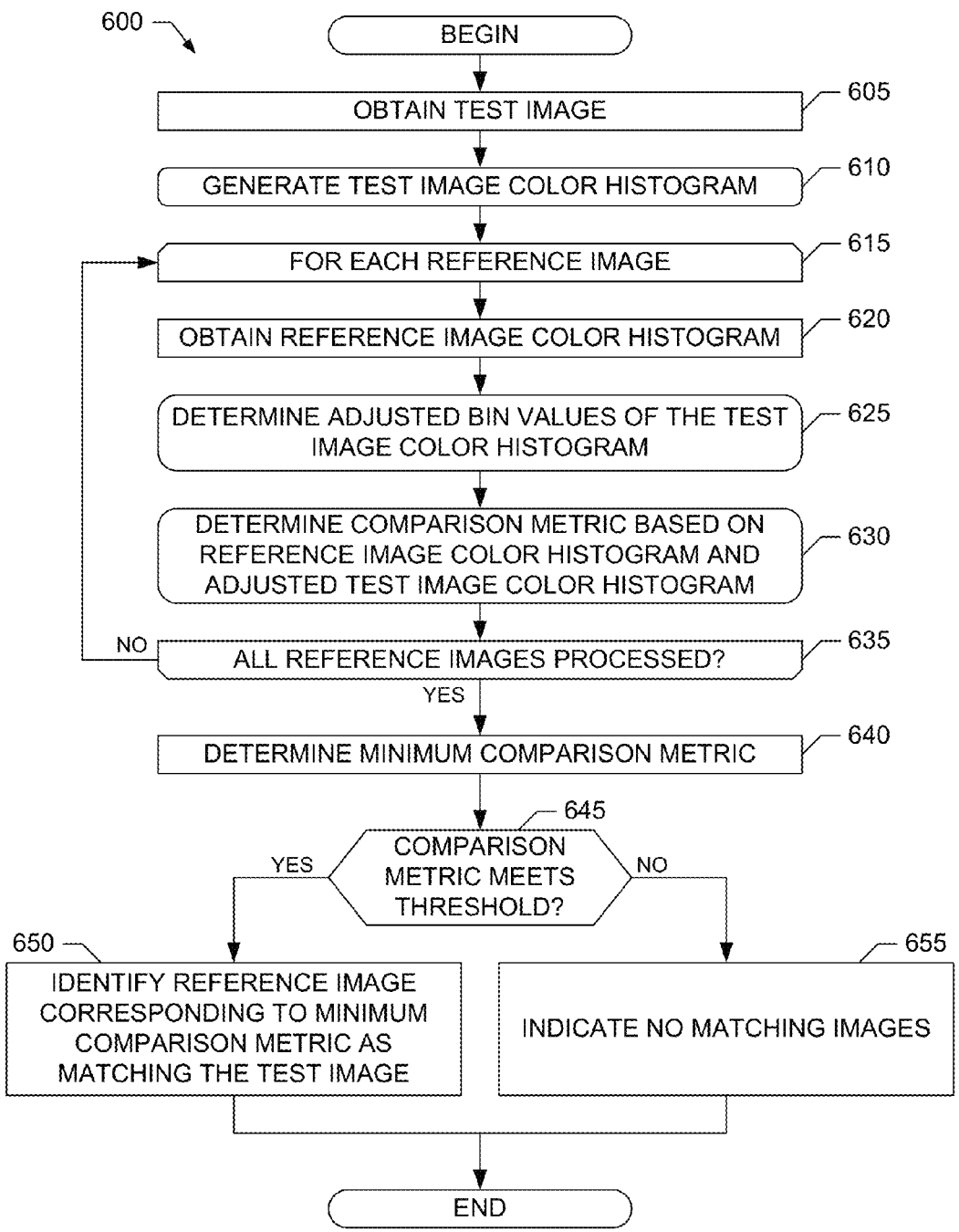
FIG. 6 is a flowchart representative of example machine readable instructions that may be executed to implement the example image comparison system of FIG. 1.
Figure 7:
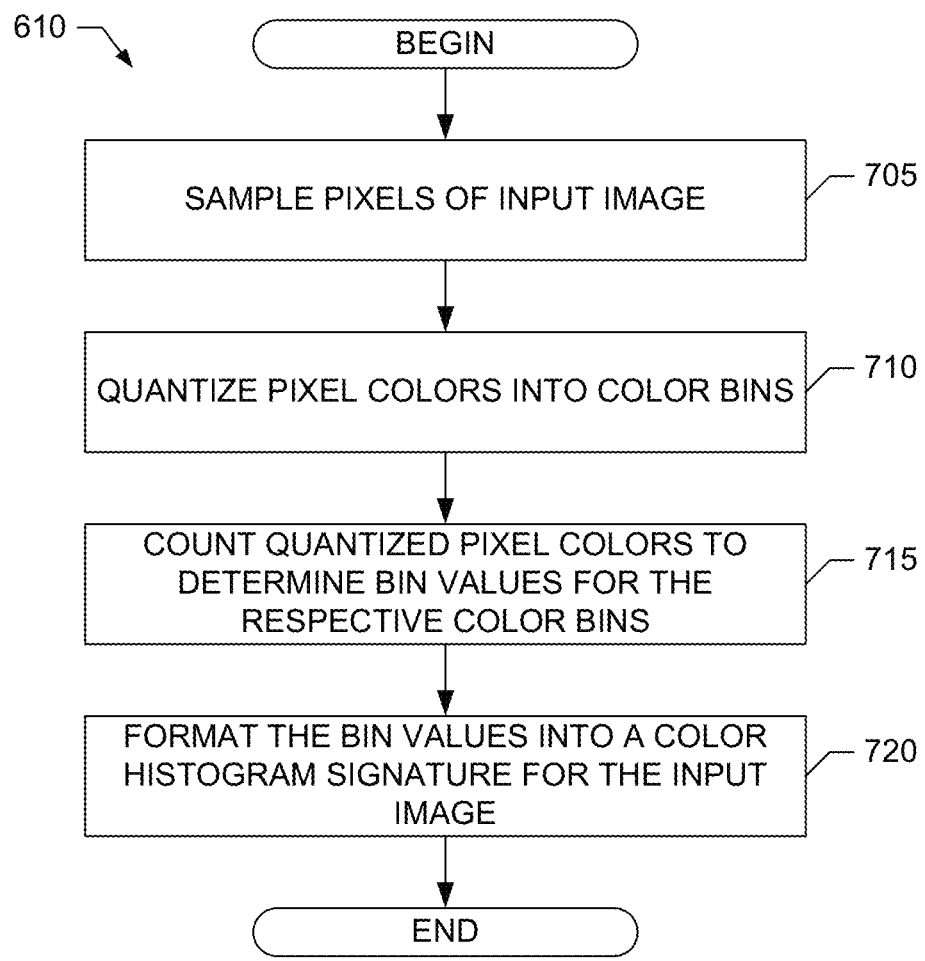
FIG. 7 is a flowchart representative of example machine readable instructions that may be executed to implement the example histogram generator of FIG. 2, and/or used to implement portions of the example machine readable instructions of FIG. 6.

Example machine readable instructions 600 that may be executed to implement the example image comparison system 100 of FIG. 1 are represented by the flowchart shown in FIG. 6. The example machine readable instructions 600 may be executed, for example, when a test image is to be compared with one or more reference images. With reference to the preceding figures, the machine readable instructions 600 of FIG. 6 begin execution at block 605 at which the test image interface 120 of the image comparison system 100 obtains, as described above, a test (e.g., input) image for comparison with the set of reference images stored in the reference image library 105. At block 610, the histogram generator 125 of the image comparison system 100 determines a test color histogram, as described above, for the test image obtained at block 605. Example machine readable instructions that may be used to implement the processing at block 610 are illustrated in FIG. 7, which is described in greater detail below.

At block 615, the image comparison system 100 begins color histogram comparison processing to compare the test image obtained at block 605 to the reference image(s) included in the set of reference images stored in the reference image library 105 of the image comparison system 100. For example, at block 620 the image comparison system 100 accesses the reference histogram library 115 of the image comparison system 100 to obtain the reference color histogram for the next reference image in the reference image library 105 to be compared with the test image. As described above, the histogram generator 110 of the image comparison system 100 can be used to generate a respective set of reference color histograms for the set of reference images using processing similar to the processing (e.g., such as the processing at block 610) performed to generate the test color histogram for the test image.

Figure 8:
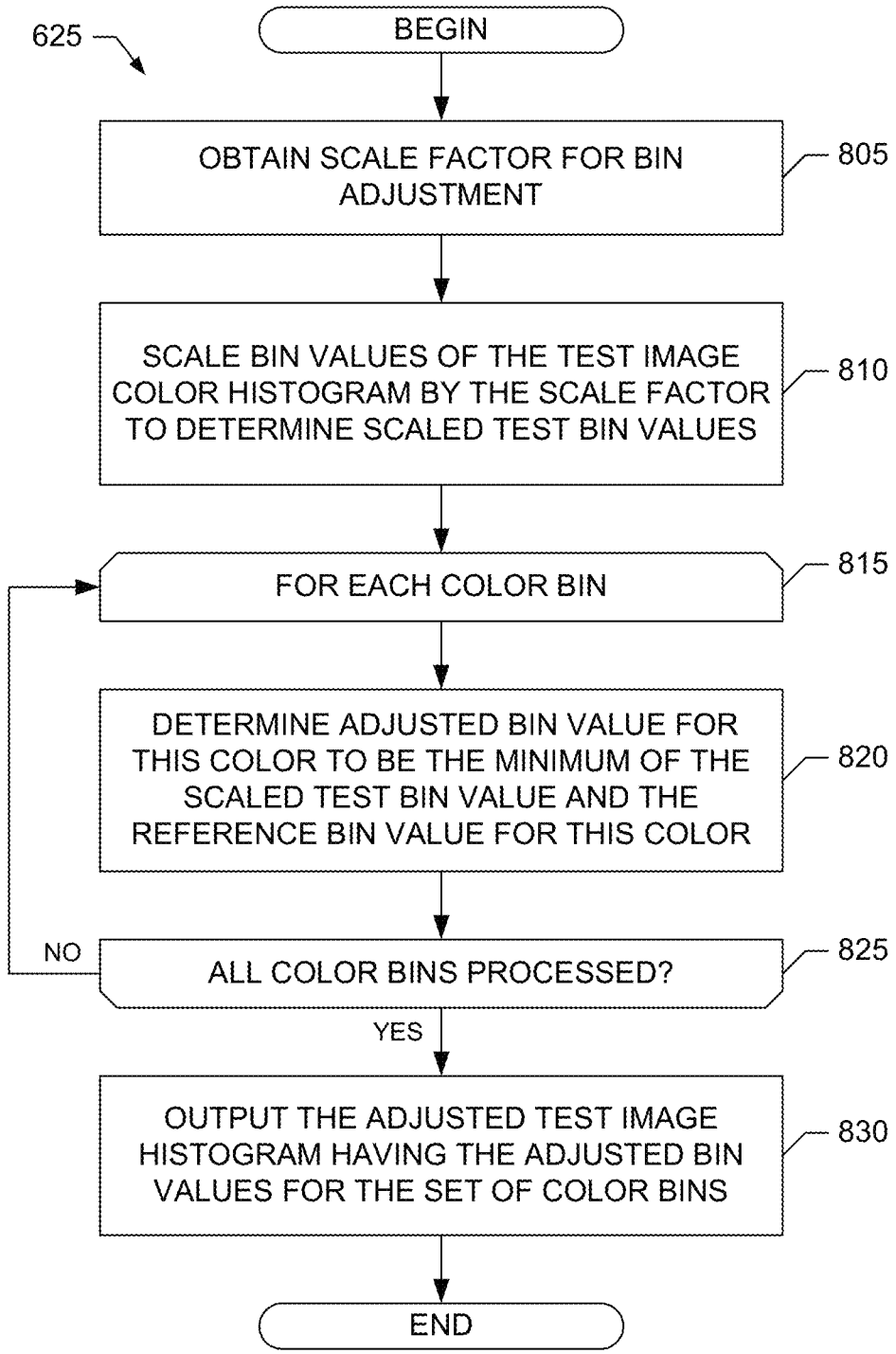
FIG. 8 is a flowchart representative of example machine readable instructions that may be executed to implement the example bin adjuster of FIG. 4 in the example histogram comparator of FIG. 3, and/or used to implement portions of the example machine readable instructions of FIG. 6.

At block 625, the histogram comparator 130 of the image comparison system 100 determines adjusted bin values of the test color histogram generated at block 610 for the test image. For example, at block 625, the bin adjuster 315 of the histogram comparator 130 uses the bin values of the reference color histogram obtained at block 620 and a scale factor, as described above, to determine the adjusted bin values of the test color histogram. Example machine readable instructions that may be used to implement the processing at block 625 are illustrated in FIG. 8, which is described in greater detail below.

Figure 9:
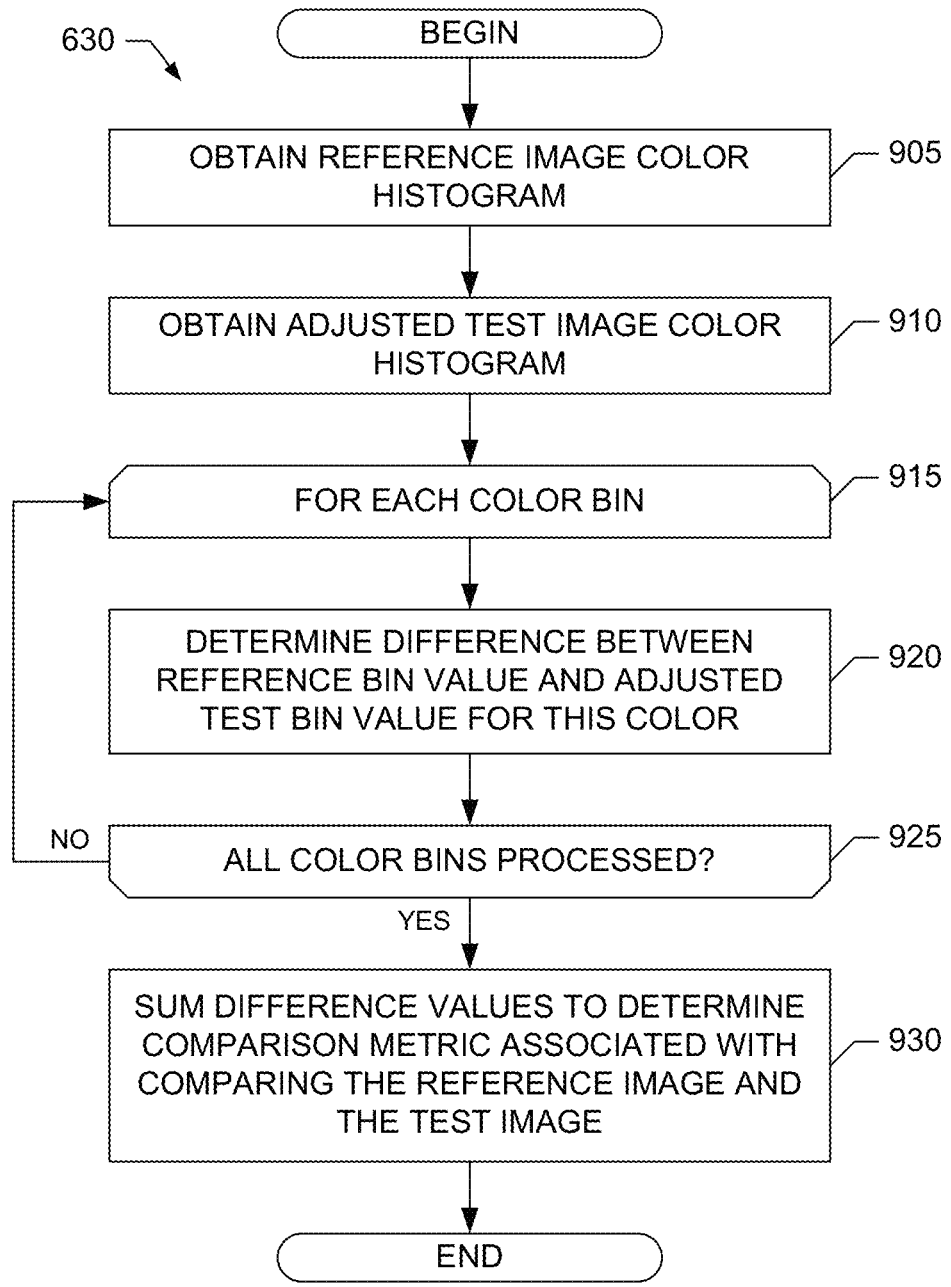
FIG. 9 is a flowchart representative of example machine readable instructions that may be executed to implement the example comparison metric determiner of FIG. 5 in the example histogram comparator of FIG. 3, and/or used to implement portions of the example machine readable instructions of FIG. 6.

At block 630, the histogram comparator 130 determines, based on the bin values of the reference color histogram obtained at block 620 and the adjusted bin values of the test color histogram determined at block 625, a comparison metric for the reference image that quantifies the results of comparing the reference image with the test image. For example, at block 630, the comparison metric determiner 320 of the histogram comparator 130 can determine the comparison metric by summing the differences between bin values of the reference color histogram and respective adjusted bin values of the test color histogram, as described above. Example machine readable instructions that may be used to implement the processing at block 630 are illustrated in FIG. 9, which is described in greater detail below.

In the illustrated example, the processing at blocks 620-630 is repeated for each reference image to be compared with the test image. After the set of reference images stored in the reference image library 105 (or a selected subset) has been compared with the test image (block 635), the image comparison system 100 has determined a set of comparison metrics including a respective comparison metric for each reference image compared with the test image. At block 640, the histogram comparator 130 identifies the minimum comparison metric from among the set of comparison metrics determined for the set of reference images. At block 645, the threshold comparator 325 of the histogram comparator 130 compares the minimum comparison metric to a threshold, as described above. In the illustrated example, if the minimum comparison metric is less than or equal to the threshold (or otherwise meets the threshold) at block 645, then at block 650 the histogram comparator 130 identifies the particular reference image associated with the minimum comparison metric as being a match of the test image. However, if the minimum comparison metric is greater than the threshold (or otherwise does not meet the threshold) at block 645, then at block 655 the histogram comparator 130 indicates that no reference images were determined to match the test image. Execution of the example machine readable instructions 600 then ends.

Example machine readable instructions 610 that may be used to implement one or more of the histogram generators 110, 125 and/or 200, and/or to perform the processing at block 610 of FIG. 6, are illustrated in FIG. 7. For brevity, execution of the machine readable instructions 610 of FIG. 7 is described from the perspective of implementation by the histogram generator 200. However, the machine readable instructions 610 of FIG. 7 could additionally or alternatively be executed by the histogram generators 110 and/or 125.

With reference to the preceding figures, execution of the machine readable instructions 610 of FIG. 7 begins at block 705 at which the image sampler 205 of the histogram generator 200 samples, as described above, pixels of an input (e.g., test) image to determine a set of pixels of the image for which a color histogram is to be determined. At block 710, the color quantizer 210 of the histogram generator 200 quantizes the color values (e.g., three color values, such as red, blue and green) of the sampled pixels into respective sets of color levels, as described above, to yield a total number of possible color combinations and, thus, a total number of color bins represented by the color histogram. At block 715, the color counter 215 of the histogram generator 200 counts the numbers of times each possible quantized color combination appears in the sampled set of pixels to determine the bin values of the color bins of the color histogram. At block 720, the histogram formatter 220 of the histogram generator 200 formats the bin values of the color bins into a color histogram data representation, such as a color histogram signature, for the input image, which may be stored and/or used in subsequent processing. Execution of the example machine readable instructions 610 then ends.

Example machine readable instructions 625 that may be used to implement the bin adjuster 315 of the histogram comparator 130, and/or to perform the processing at block 625 of FIG. 6, are illustrated in FIG. 8. With reference to the preceding figures, execution of the machine readable instructions 625 of FIG. 8 begins at block 805 at which the bin adjuster 315 obtains the scale factor described above. At block 810, the bin adjuster 315 scales the bin values of the test color histogram of the test image by the scale factor obtained at block 805 to obtain the scaled bin values of the test color histogram. At block 815, the bin adjuster 315 begins processing to adjust each bin value of the test color histogram. For example, at block 820, the bin adjuster 315 determines the adjusted bin value for a particular color bin to be the smaller, or minimum, of the scaled bin value for this color bin or the bin value of the reference color histogram for the reference image to which the test image is being compared, as described above. After the bin values of the test color histogram have been adjusted (block 825), at block 830 the bin adjuster 315 outputs the adjusted bin values determined for the test color histogram of the test image. Execution of the example machine readable instructions 625 then ends.

Example machine readable instructions 630 that may be used to implement the comparison metric determiner 320 of the histogram comparator 130, and/or to perform the processing at block 630 of FIG. 6, are illustrated in FIG. 9. With reference to the preceding figures, execution of the machine readable instructions 630 of FIG. 9 begins at block 905 at which the comparison metric determiner 320 obtains the reference color histogram for the reference image that is to be compared with the test image. At block 910, the comparison metric determiner 320 obtains the adjusted test color histogram having adjusted bin values as determined by, for example, the bin adjuster 315, the example machine readable instructions 625, etc. At block 915, the comparison metric determiner 320 begins determining differences between bin values of the reference color histogram and respective adjusted bin values of the adjusted test color histogram. For example, at block 920, the comparison metric determiner 320 determines, for each color bin, a difference between the bin value of the reference color histogram and the adjusted bin value of the test color histogram for the particular color bin. After the differences for all color bins have been determined (block 925), at block 930 the comparison metric determiner 320 sums the difference values determined for each color bin to determine the comparison metric associated with the reference image being compared with the test image. Execution of the example machine readable instructions 630 then ends.

Figure 10:
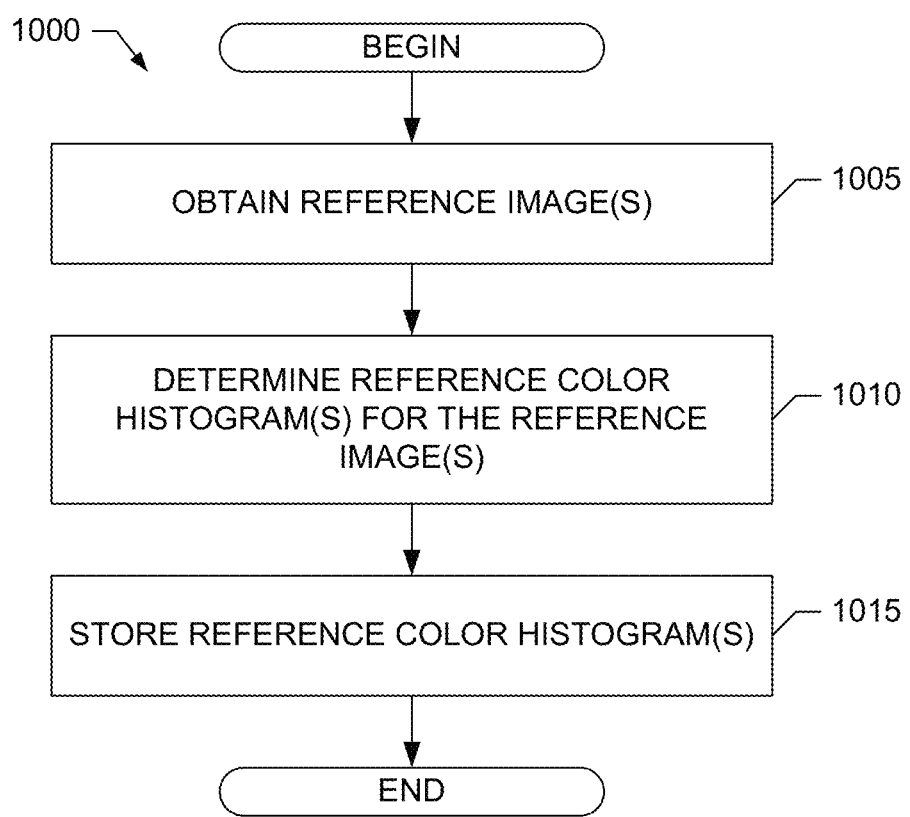
FIG. 10 is a flowchart representative of example machine readable instructions that may be executed to process a set of reference images to determine a respective set of reference color histograms for use by the example image comparison system of FIG. 1.

Example machine readable instructions 1000 that may be executed to determine the reference color histograms stored in the reference histogram library 115 of the example image comparison system 100 and/or obtained at block 620 of example machine readable instructions 600 are represented by the flowchart shown in FIG. 10. With reference to the preceding figures, execution of the example machine readable instructions 1000 of FIG. 10 begins at block 1005 at which the histogram generator 110 obtains the reference image(s) from the reference image library 105 for which reference color histogram(s) is(are) to be determined. At block 1010, the histogram generator 110 determines the reference color histogram(s) for the reference image(s) obtained at block 1005, as described above. For example, the histogram generator 110 can execute the example machine readable instructions 610 illustrated in FIG. 7 to determine the reference color histogram(s) at block 1010. At block 1015, the histogram generator 110 stores the generated reference color histogram(s) in the reference histogram library 115. Execution of the example machine readable instructions 1000 then ends.

Figure 11:
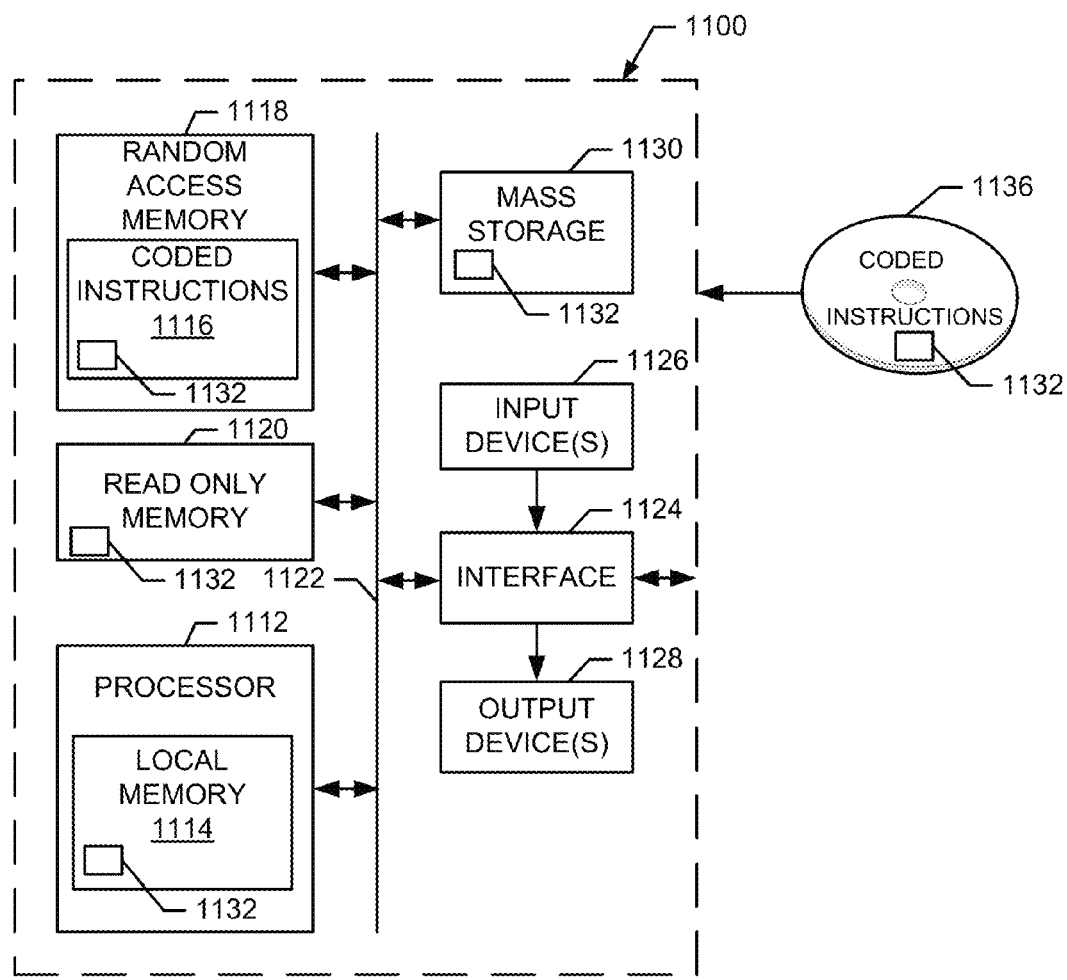
FIG. 11 is a block diagram of an example processing system that may execute the example machine readable instructions of FIGS. 6-9 and/or 10 to implement the example image comparison system of FIG. 1, the example histogram generator of FIG. 2, the example histogram comparator of FIG. 3, the example bin adjuster of FIG. 4 and/or the example comparison metric determiner of FIG. 5.

FIG. 11 is a block diagram of an example processing system 1100 capable of executing the instructions of FIGS. 6-10 to implement the example image comparison system 100, the example histogram generators 110, 125 and/or 200, the example test interface 120, the example histogram comparator 130, the example results interface 135, the example image sampler 205, the example color quantizer 210, the example color counter 215, the example histogram formatter 220, the example test histogram interface 305, the example reference histogram interface 310, the example bin adjuster 315, the example comparison metric determiner 320, the example threshold comparator 325, the example bin scaler 405, the example value selector 410, the example bin difference determiner 505 and/or the example difference summer 510 of FIGS. 1-5. The processing system 1100 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1100 of the instant example includes a processor 1112. For example, the processor 1112 can be implemented by one or more microprocessors and/or controllers from any desired family or manufacturer. The processor 1112 includes a local memory 1114, and executes coded instructions 1116 present in the local memory 1114 and/or in another memory device.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory, including the memories 1118, and 1120, is controlled by a memory controller.

The processing system 1100 also includes an interface circuit 1124. The interface circuit 1124 may be implemented by any type of interface standard, such as an Ethernet interface, a universal serial bus (USB), and/or a PCI express interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, a trackbar (such as an isopoint), a voice recognition system, and/or any other human-machine interface.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the reference image library 105 and/or the reference histogram library 115. Additionally or alternatively, in some examples the volatile memory 1118 may implement the reference image library 105 and/or the reference histogram library 115.

Coded instructions 1132 corresponding to the instructions of FIGS. 6-10 may be stored in the mass storage device 1130, in the volatile memory 1118, in the non-volatile memory 1120, in the local memory 1114 and/or on a removable storage medium, such as a CD or DVD 1136.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to compare images, the method comprising:
   adjusting, by executing an instruction with a processor, a color histogram associated with an input image based on a first reference color histogram associated with a first reference image to determine a first adjusted color histogram associated with the input image;
   comparing, by executing an instruction with the processor, the first adjusted color histogram and the first reference color histogram to determine whether the first reference image matches the input image; and
   displaying, by executing an instruction with the processor, a version of the first reference image adjacent to a display of the input image in response to determining that the first reference image matches the input image.

2. The method as defined in claim 1, further including:
   adjusting the color histogram associated with the input image based on a second reference color histogram associated with a second reference image to determine a second adjusted color histogram associated with the input image;
   comparing the second adjusted color histogram and the second reference color histogram to determine whether the second reference image matches the input image; and
   displaying a version of the second reference image adjacent to a display of the input image in response to determining that the second reference image matches the input image.

3. The method as defined in claim 1, wherein the adjusting of the color histogram associated with the input image includes adjusting the color histogram associated with the input image based on the first reference color histogram and a scale factor to determine the first adjusted color histogram associated with the input image.

4. The method as defined in claim 1, wherein the version of the first reference image corresponds to a thumbnail version of the first reference image.

5. The method as defined in claim 1, further including:
   capturing the input image with a camera; and
   processing digital pixels of the input image to determine the color histogram associated with the input image.

6. A method to compare images, the method comprising:
   adjusting, by executing an instruction with a processor, a color histogram associated with an input image based on a first reference color histogram associated with a first reference image to determine a first adjusted color histogram associated with the input image, the adjusting including:
      multiplying a value of a first bin of the color histogram associated with the input image by a scale factor to determine a scaled bin value; and
      determining an adjusted value of a corresponding first bin of the first adjusted color histogram to be a smaller of the scaled bin value and a value of a corresponding first bin of the reference color histogram;
   comparing, by executing an instruction with the processor, the first adjusted color histogram and the first reference color histogram to determine whether the first reference image matches the input image; and
   displaying, by executing an instruction with the processor, a version of the first reference image adjacent to a display of the input image in response to determining that the first reference image matches the input image.

7. A method to compare images, the method comprising:
   adjusting, by executing an instruction with a processor, a color histogram associated with an input image based on a first reference color histogram associated with a first reference image to determine a first adjusted color histogram associated with the input image;
   comparing, by executing an instruction with the processor, the first adjusted color histogram and the first reference color histogram to determine whether the first reference image matches the input image, the comparing including:
      determining a sum of differences between bins of the first adjusted color histogram and corresponding bins of the first reference color histogram; and
      comparing the sum to a threshold to determine whether the first reference image matches the input image; and
   displaying, by executing an instruction with the processor, a version of the first reference image adjacent to a display of the input image in response to determining that the first reference image matches the input image.

8. A tangible computer readable medium comprising computer readable instructions which, when executed, cause a processor to at least:
   adjust a color histogram associated with an input image based on a first reference color histogram associated with a first reference image to determine a first adjusted color histogram associated with the input image;
   compare the first adjusted color histogram and the first reference color histogram to determine whether the first reference image matches the input image; and display a version of the first reference image adjacent to a display of the input image in response to determining that the first reference image matches the input image.

9. The tangible computer readable medium as defined in claim 8, wherein the instructions, when executed, further cause the processor to:
adjust the color histogram associated with the input image based on a second reference color histogram associated with a second reference image to determine a second adjusted color histogram associated with the input image;
compare the second adjusted color histogram and the second reference color histogram to determine whether the second reference image matches the input image; and
display a version of the second reference image adjacent to a display of the input image in response to determining that the second reference image matches the input image.

10. The tangible computer readable medium as defined in claim 8, wherein to adjust the color histogram associated with the input image, the instructions, when executed, further cause the processor to adjust the color histogram associated with the input image based on the first reference color histogram and a scale factor to determine the first adjusted color histogram associated with the input image.

11. The tangible computer readable medium as defined in claim 8, wherein the version of the first reference image corresponds to a thumbnail version of the first reference image.

12. The tangible computer readable medium as defined in claim 8, wherein the instructions, when executed, further cause the processor to:
capture the input image with a camera; and
process digital pixels of the input image to determine the color histogram associated with the input image.

13. A tangible computer readable medium comprising computer readable instructions which, when executed, cause a processor to at least:
adjust a color histogram associated with an input image based on a first reference color histogram associated with a first reference image to determine a first adjusted color histogram associated with the input image, wherein to adjust the color histogram associated with the input image, the instructions, when executed, further cause the processor to:
multiply a value of a first bin of the color histogram associated with the input image by a scale factor to determine a scaled bin value; and
determine an adjusted value of a corresponding first bin of the first adjusted color histogram to be a smaller of the scaled bin value and a value of a corresponding first bin of the reference color histogram;
compare the first adjusted color histogram and the first reference color histogram to determine whether the first reference image matches the input image; and
display a version of the first reference image adjacent to a display of the input image in response to determining that the first reference image matches the input image.

14. A tangible computer readable medium comprising computer readable instructions which, when executed, cause a processor to at least:
adjust a color histogram associated with an input image based on a first reference color histogram associated with a first reference image to determine a first adjusted color histogram associated with the input image;
compare the first adjusted color histogram and the first reference color histogram to determine whether the first reference image matches the input image, wherein to compare the first adjusted color histogram and the first reference color histogram, the instructions, when executed, further cause the processor to:
determine a sum of differences between bins of the first adjusted color histogram and corresponding bins of the first reference color histogram; and
compare the sum to a threshold to determine whether the first reference image matches the input image; and
display a version of the first reference image adjacent to a display of the input image in response to determining that the first reference image matches the input image.

15. An apparatus to compare images, the apparatus comprising:
a histogram comparator to:
adjust a color histogram associated with an input image based on a first reference color histogram associated with a first reference image to determine a first adjusted color histogram associated with the input image; and
compare the first adjusted color histogram and the first reference color histogram to determine whether the first reference image matches the input image; and
a results interface to display a version of the first reference image adjacent to a display of the input image in response to determining that the first reference image matches the input image.

16. The apparatus as defined in claim 15, wherein the version of the first reference image corresponds to a thumbnail version of the first reference image.

17. The apparatus as defined in claim 15, further including:
an image interface to capture the input image with a camera; and
a histogram generator to process digital pixels of the input image to determine the color histogram associated with the input image.

18. An apparatus to compare images, the apparatus comprising:
a histogram comparator to:
adjust a color histogram associated with an input image based on a first reference color histogram associated with a first reference image to determine a first adjusted color histogram associated with the input image; and
compare the first adjusted color histogram and the first reference color histogram to determine whether the first reference image matches the input image, wherein the histogram comparator includes a bin adjuster to adjust the color histogram associated with the input image based on the first reference color histogram and a scale factor to determine the first adjusted color histogram associated with the input image; and
a results interface to display a version of the first reference image adjacent to a display of the input image in response to determining that the first reference image matches the input image.

19. The apparatus as defined in claim 18, wherein the bin adjuster is further to:
multiply a value of a first bin of the color histogram associated with the input image by the scale factor to determine a scaled bin value; and determine an adjusted value of a corresponding first bin of the first adjusted color histogram to be a smaller of the scaled bin value and a value of a corresponding first bin of the reference color histogram.

20. An apparatus to compare images, the apparatus comprising:
a histogram comparator to:
adjust a color histogram associated with an input image based on a first reference color histogram associated with a first reference image to determine a first adjusted color histogram associated with the input image; and
compare the first adjusted color histogram and the first reference color histogram to determine whether the first reference image matches the input image, wherein the histogram comparator includes:
a comparison metric determiner to determine a sum of differences between bins of the first adjusted color histogram and corresponding bins of the first reference color histogram; and
a threshold comparator to compare the sum to a threshold to determine whether the first reference image matches the input image; and
a results interface to display a version of the first reference image adjacent to a display of the input image in response to determining that the first reference image matches the input image.

* * * * *